(12) United States Patent
Ghezzo

(10) Patent No.: US 12,480,476 B2
(45) Date of Patent: Nov. 25, 2025

(54) STATE MONITORING DEVICE, ROTOR BLADE, AND WIND TURBINE COMPRISING SAME

(71) Applicant: HARTING INTERNATIONAL INNOVATION AG, Biel (CH)

(72) Inventor: Fabrizia Ghezzo, Biel (CH)

(73) Assignee: HARTING International Innovation AG, Biel (CH)

( * ) Notice: Subject to any disclaimer, the term of this patent is extended or adjusted under 35 U.S.C. 154(b) by 0 days.

(21) Appl. No.: 18/851,803

(22) PCT Filed: Mar. 30, 2023

(86) PCT No.: PCT/EP2023/058408
§ 371 (c)(1),
(2) Date: Sep. 27, 2024

(87) PCT Pub. No.: WO2023/187122
PCT Pub. Date: Oct. 5, 2023

(65) Prior Publication Data
US 2025/0198391 A1 Jun. 19, 2025

(30) Foreign Application Priority Data
Mar. 31, 2022 (DE) .................. 10 2022 107 681.4

(51) Int. Cl.
*F03D 17/00* (2016.01)
(52) U.S. Cl.
CPC ......... *F03D 17/028* (2023.08); *F03D 17/004* (2023.08); *F05B 2270/331* (2013.01); *F05B 2270/808* (2013.01)

(58) Field of Classification Search
CPC ................. F03D 17/028; F03D 17/004; F05B 2270/331; F05B 2270/808
See application file for complete search history.

(56) References Cited

U.S. PATENT DOCUMENTS 8,786,117 B2 * 7/2014 Winslow ................. G01P 5/165
416/61
9,812,926 B1 * 11/2017 Rodriguez ................ F03D 9/00
(Continued)

FOREIGN PATENT DOCUMENTS

DE 10219664 A1 11/2003
DE 102012108776 A1 3/2014
(Continued)

OTHER PUBLICATIONS

Search Report from counterpart German Patent Application No. 10 2022 107 681.4, mailed on Dec. 7, 2022, 6 pages.
(Continued)

*Primary Examiner* — Pedro J Cuevas

(57) ABSTRACT

A state monitoring device for at least one rotor blade of a wind turbine, having at least one flexible sensor device with a plurality of measuring sections, which are arranged on a plurality of sections of the rotor blade and are designed so as to measure at least one respective parameter, and a processing device for detecting and/or processing the measured parameters. The device also relates to a rotor blade for a wind turbine, having at least one such state monitoring device, and to a wind turbine, having such a state monitoring device or such a rotor blade.

15 Claims, 3 Drawing Sheets

(56) References Cited

U.S. PATENT DOCUMENTS

| | | | |
|---|---|---|---|
| 9,897,068 B2 | 2/2018 | Bendel | |
| 10,436,174 B2* | 10/2019 | Holtom | F03D 1/0675 |
| 11,555,481 B2* | 1/2023 | Rosen | F03D 17/00 |
| 11,668,275 B2* | 6/2023 | Tobin | B29C 70/08 |
| | | | 416/61 |
| 2009/0309359 A1* | 12/2009 | Winslow | G01P 5/16 |
| | | | 416/61 |
| 2010/0296940 A1* | 11/2010 | Zuteck | F03D 1/0675 |
| | | | 416/232 |
| 2010/0296941 A1* | 11/2010 | Zuteck | F03D 1/0675 |
| | | | 416/226 |
| 2011/0211200 A1 | 9/2011 | Cribbs | |
| 2012/0186730 A1* | 7/2012 | Shindo | B29C 70/38 |
| | | | 156/160 |
| 2015/0211969 A1 | 7/2015 | Müller et al. | |
| 2016/0146195 A1* | 5/2016 | Holtom | G01S 17/58 |
| | | | 356/28 |
| 2018/0258916 A1 | 9/2018 | Sawada et al. | |
| 2019/0153995 A1* | 5/2019 | Tobin | B29C 70/302 |
| 2020/0057002 A1* | 2/2020 | Jung | F03D 17/00 |
| 2020/0116128 A1 | 4/2020 | Pedersen et al. | |
| 2021/0199094 A1 | 7/2021 | Mai | |
| 2022/0307878 A1* | 9/2022 | Sorin | G01F 1/56 |

FOREIGN PATENT DOCUMENTS

| | | |
|---|---|---|
| DE | 102017104490 A1 | 9/2018 |
| DE | 102018112825 A1 | 12/2019 |
| DE | 102016117916 B4 | 9/2020 |
| EP | 2904261 B1 | 4/2018 |
| WO | 2020052939 A1 | 3/2020 |

OTHER PUBLICATIONS

International Search Report and Written Opinion received for PCT Patent Application No. PCT/EP2023/058408, mailed on Jul. 19, 2023, 13 Pages.

\* cited by examiner

STATE MONITORING DEVICE, ROTOR BLADE, AND WIND TURBINE COMPRISING SAME

REFERENCE DATA

This application is a National Phase entry of International Application Ser. No. PCT/EP2023/058408, filed on Mar. 30, 2023, which claims the benefit of priority of German Patent Application Ser. No. 10 2022 107 681.4, filed on Mar. 31, 2022. The entire content of these applications is hereby incorporated by reference.

TECHNICAL DOMAIN

The invention relates to a state monitoring apparatus for at least one rotor blade of a wind turbine, to a rotor blade comprising such a state monitoring apparatus, and to a wind turbine having such a state monitoring apparatus.

RELATED ART

Rotor blades of wind turbines have to undergo regular maintenance because they are exposed to wind and weather as well as other influences, for example being struck by a bird. An essential part of a maintenance appointment consists in searching for physical damage to the rotor blades. Such damage may, for example, be due to quality variations during manufacturing which may, for example, cause bonded structures to separate or individual layers to detach. Moreover, damage may, for example, occur during use due to fatigue fractures, lightning and/or corrosion.

For constructions with materials for which damage is easily visible, an inspection of the rotor blades is done visually. Other materials possibly require a follow-up inspection, for example with ultrasound.

Despite regular inspections, a state of aging of the rotor blades can only be determined very inaccurately and so large margins of safety are taken into account in the design when the rotor blades are being constructed. Since the frequentness of one-off events with a partially high load, for example being struck by a bird or hail, and the contribution of variable external influences, such as the weather, for example, in particular by frost and ice, can be difficult to predict and is also dependent on the exact site of the wind turbine, inspections are likewise scheduled at a frequentness which contains a margin of safety. In addition, complex loads, for example shear and torque loads, can only be inadequately modeled. Due to the high and variable load on the rotor blades, inspections are necessary at regular intervals at least once a year.

During an inspection, a wind turbine is necessarily stationary and cannot generate any power. Depending on the construction, dismounting of the rotor blades is necessary. Even today, inspections of wind turbines are primarily carried out by human engineers.

All of these aspects result in high costs which make up a substantial amount of the overall costs over the lifetime of a wind turbine.

SHORT DISCLOSURE OF THE INVENTION

Against this background, the invention achieves the object of reducing the expenditure caused by inspections.

The object is achieved by a state monitoring apparatus as claimed in patent claim 1, a rotor blade as claimed in patent claim 10 and a wind turbine as claimed in patent claim 12. Advantageous configurations are the subject matter of the dependent claims.

The object is achieved by a state monitoring apparatus for at least one rotor blade of a wind turbine, which comprises at least one flexible sensor device having a multiplicity of measuring sections, wherein the measuring sections are arranged and set up on a multiplicity of sections of the rotor blade to each measure at least one parameter, and a processing device for detecting and/or processing the measured parameters.

Measuring mechanical parameters of the rotor blade on a multiplicity of measuring sections allows an accumulated load and transient overloads of the rotor blade to be ascertained. Conclusions can be drawn therefrom as to how likely damage to the rotor blade is after a certain period of time. The inspection intervals can be adjusted accordingly to suit the conditions prevailing at the installation site of the wind turbine. Unnecessary inspections and therefore also the expenditure caused by the inspections are thus reduced.

In some embodiments, the processing device is set up to identify a state of the rotor blade on the basis of the detected parameters, wherein the state can be at least one of the following states: normal state, warning state and/or switch-off state.

The processing device thus allows the numerous measured mechanical parameters to be combined to form one result which is able to be easily understood by a user. In this case, states for identification which are relevant to the operation can be selected.

In some embodiments, the state monitoring apparatus has an assigned inspection device for inspecting the rotor blade, wherein the inspection is able to be triggered by identification of a predetermined state.

As a result, an automatic inspection of the rotor blade can be triggered without the intervention of an engineer, for example when a warning state is identified. As a result, the costs for inspections are further reduced.

In some embodiments, the inspection device comprises an unmanned aerial vehicle for inspecting the rotor blade.

Such an unmanned aerial vehicle (or UAV) can carry out an inspection, for example a visual inspection, of the rotor blade, for example from outside, particularly easily. Dismounting the rotor blade is not necessary for this, which means it is possible to carry out this inspection in a particularly time-saving manner or also by remote control.

In some embodiments, the inspection device comprises an unmanned surface drone for inspecting the rotor blade.

Such a drone can for example carry out an inspection of the surfaces and/or an ultrasound inspection in an efficient manner. Herewith, firstly, a manual inspection during which maintenance personnel have to perform a check while climbing on and/or in the rotor blades is unnecessary. Secondly, dismounting the rotor blade, conceivable in extreme cases, is not required for this. As a result, this inspection is able to be carried out in a particularly time-saving manner or also by remote control. Ideally, an inspection carried out by drones can be automated. Such drones can be used both on an outer and on an inner surface of the rotor blade.

In some embodiments, it is possible for the sensor device to be able to be heated at least in sections.

As a result, it is possible, for example, to remove ice on the rotor blade in a cost-effective manner. In particular, it is possible to cover large areas of the rotor blade with the sensor device in a cost-effective manner. Moreover, the heatable sensor device can at least hinder the formation of ice on the surface of a rotor blade already before ice forms.

In some embodiments, at least part of the sensor device is able to be laminated together with layers of the rotor blade.

By virtue of the force-fitting connection with the material of the rotor blade, this ensures a particularly exact detection of the mechanical parameters and thus improves the precision of the identification of the need for an inspection. In addition, if the sensor device is configured to be heatable, no further heating layer made of a material which is unsuitable for the lamination is necessary in the rotor blade. In some embodiments, the sensor device comprises a sensor fabric.

Such sensor fabrics are able to be adapted particularly well to suit curved shapes, for example of rotor blades. Furthermore, they are space-saving, light, easy to process and provide a multiplicity of measuring sections in a particularly easy manner.

In some embodiments, the sensor device comprises an energy generation device.

This allows largely autonomous operation of the state monitoring apparatus, for example by piezoelectric energy generation from vibration.

Moreover, the object is achieved by a rotor blade for a wind turbine, comprising at least one of the state monitoring apparatuses mentioned above.

Thanks to the inclusion of the state monitoring apparatus, the inspection intervals are adjusted to suit the actual load on the rotor blade and the expenditure for inspections is thus reduced. In addition, in particular when the sensor fabric is used over a large area, detailed analysis of the mechanical and/or further parameters is possible instantly and/or continuously. As a result, for example, a digital twin of the rotor blade can be generated in a computer in order to identify problems and/or to obtain knowledge about the properties of the rotor blade, for example for material tests.

In some embodiments, the sensor device is at least in part laminated into the rotor blade.

As a result, particularly accurate measurement of the mechanical parameter on the rotor blade is made possible.

Moreover, the object is achieved by a wind turbine comprising at least one of the state monitoring apparatuses mentioned above.

Thanks to the inclusion of the state monitoring apparatus, the inspection intervals are adjusted to suit the actual load on the rotor blade and the expenditure for inspections is thus reduced. If the sensor device is configured to be heatable, ice formation and damage associated therewith can also be avoided from the start and the inspection intervals are thus lengthened. In some embodiments, the wind turbine comprises a control device for controlling the wind turbine, wherein the control device is set up to switch off the wind turbine when a predetermined switch-off state is identified.

Thus, if the processing device identifies an overload on and/or damage to at least one rotor blade on the basis of the measured mechanical parameters, automatic switching-off of the wind turbine is then initiated.

As a result, the rotor blade triggering the switching-off can be inspected immediately, for example by means of the inspection device if the wind turbine comprises such an inspection device.

SHORT DESCRIPTION OF THE DRAWINGS

An exemplary embodiment of the invention is illustrated in the drawings and is explained in more detail below. In the drawings.

EXAMPLES OF EMBODIMENTS OF THE PRESENT INVENTION

The figures contain partially simplified, schematic illustrations. Identical reference signs are used in part for the same but optionally not identical elements. Different views of the same elements could have different scales. Directional information such as, for example, "left", "right", "above" and "below" are to be understood with regard to the respective figure and may vary with respect to the illustrated object in the individual illustrations.

Figure 1:
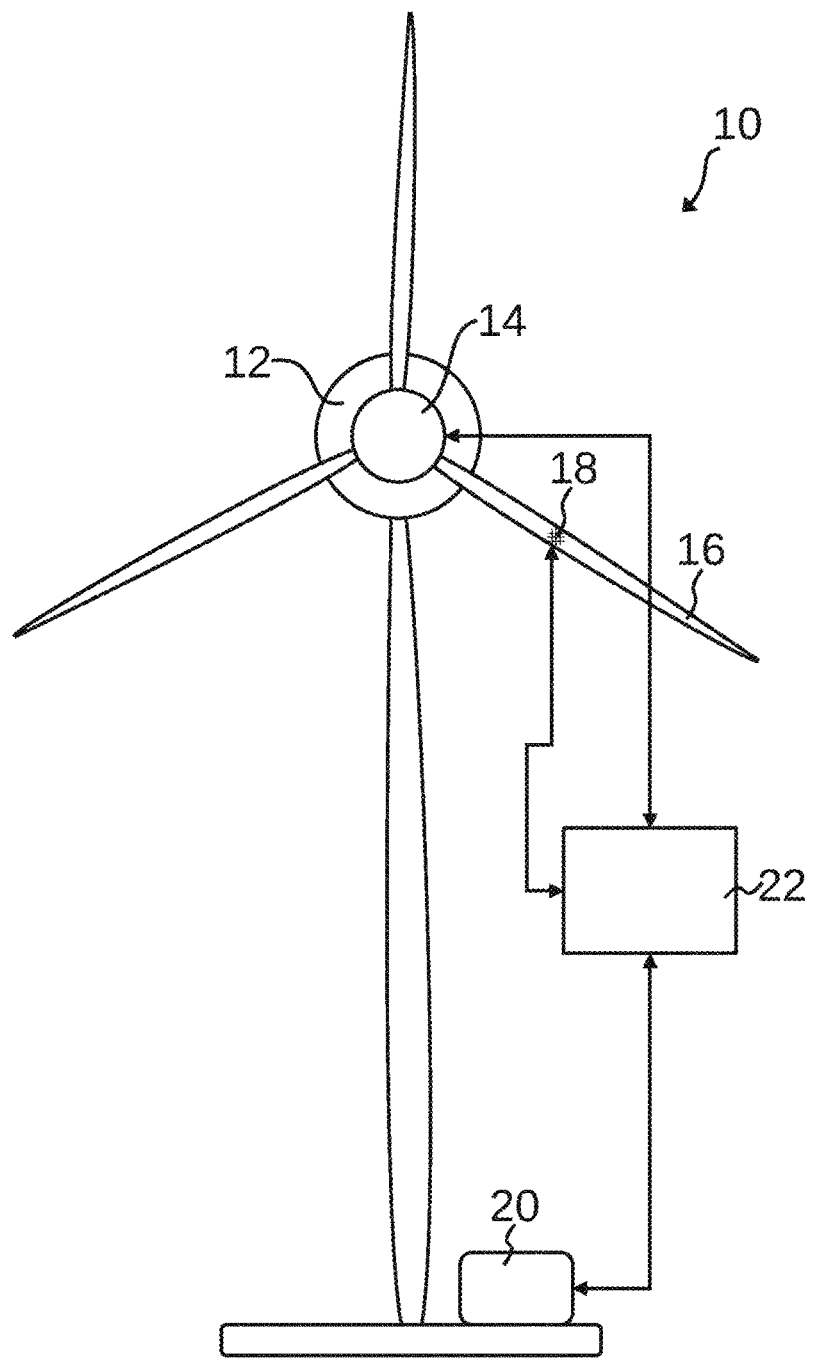
FIG. 1 shows a schematic illustration of a wind turbine according to one embodiment of the present invention.

The wind turbine 10 shown in FIG. 1 comprises a nacelle 12 on which is mounted a hub 14 from which rotor blades 16 protrude. One of the rotor blades 16 comprises a flat sensor device having a sensor fabric 18 which comprises a multiplicity of measuring sections each for measuring at least one parameter. The sensor fabric 18 is arranged in or on the rotor blade 16 such that it can measure the parameter or parameters on and/or in a multiplicity of sections of the rotor blade 16.

The wind turbine 10 further comprises an inspection device 20. In some embodiments, for example, the inspection device comprises an unmanned aerial vehicle, for example a drone. In some embodiments, for example, the inspection device comprises an unmanned surface vehicle, for example for inspecting interior and/or exterior surfaces of the rotor blade 16.

In order to control the wind turbine 10, a control device 22 is provided. The control device 22 comprises in particular a processing device for detecting the parameters measured by the sensor fabric 18. The processing device and/or the control device 22 can be set up to identify a state of the rotor blade 16 on the basis of the detected parameters, wherein the state can be at least a normal state or a warning state.

The sensor device together with the processing device, for example, forms a state monitoring apparatus.

For this purpose, the processing device monitors, for example, whether the measured mechanical parameters exceed predetermined maximum values or fall below predetermined minimum values. In further embodiments, the processing device can also monitor, for example, whether the measured mechanical parameters differ from predetermined normal values by a predetermined factor. The normal values can also be predetermined, for example, through calibration once the wind turbine 10 has been installed.

The processing device identifies a state of the rotor blade from the measured mechanical parameters, for example by means of one or more of the rules mentioned in the preceding paragraph. So long as the mechanical parameters do not leave the predetermined limits, that is to say, for example, do not exceed the predetermined maximum values, fall below predetermined minimum values and/or differ from predetermined normal values by more than a predetermined factor, the processing device identifies a normal state. As soon as the mechanical parameters leave the predetermined limits, the processing device identifies, for example, a warning state.

In addition to identifying a state, the processing device can, in some embodiments, for example, assign the events and/or parameters relevant for the triggering of the respective state to the measuring sections and thus to the sections of the rotor blade at which they have occurred. Moreover, the processing device can classify the parameters and/or the changes therein.

The warning state can mean, for example, that an inspection of at least one of the rotor blades 16 is necessary because a mechanical event which could have resulted in damage has been identified.

For this purpose, the sensor fabric 18 can, for example, be designed to measure a parameter, for example a pressure, an expansion, a temperature, a vibration, a moisture and/or an acceleration at the measuring sections. A one-off load event which is caused, for example, by hail, ice on the rotor blades or being struck by a bird and which could result in damage could thus, for example, be measured as a short-term pressure increase which exceeds a predetermined maximum pressure. Damage to the rotor blade 16 could also be present, for example, when a permanent expansion of the rotor blade 16 is determined by the sensor fabric 18.

There is a multiplicity of further known conditions which could trigger a warning state. In some embodiments, the processing device can comprise sensors for environmental conditions or can receive data from such sensors, for example moisture and/or temperature. When these measured environmental conditions move outside a target range, for example, the processing device can identify a warning state. In some embodiments, the processing device can, for example, be set up to add up measured mechanical loads over a longer period of time, to weight measured mechanical loads and/or to combine measured mechanical loads of different measuring sections in order to identify a warning state. In further embodiments, the processing device can identify further states, for example a switch-off state which indicates that the wind turbine 10 needs to be switched off. These embodiments are able to be combined in any way in order to achieve reliable identification of warning and/or switch-off states.

In some embodiments, the wind turbine 10 can, for example, be set up such that the warning state is used as the switch-off state. Thus, when the control device 22 identifies a warning state (and therefore a switch-off state at the same time), it switches off the wind turbine 10, for example.

In some embodiments, the wind turbine 10 can, for example, be set up such that an inspection by the inspection device 20 is triggered when the warning state or the switch-off state is present. Furthermore, the wind turbine 10 can, for example, be set up such that the inspection is only triggered when the wind turbine 10 is switched off and the rotor blades 16 have come to a standstill.

Figure 2:
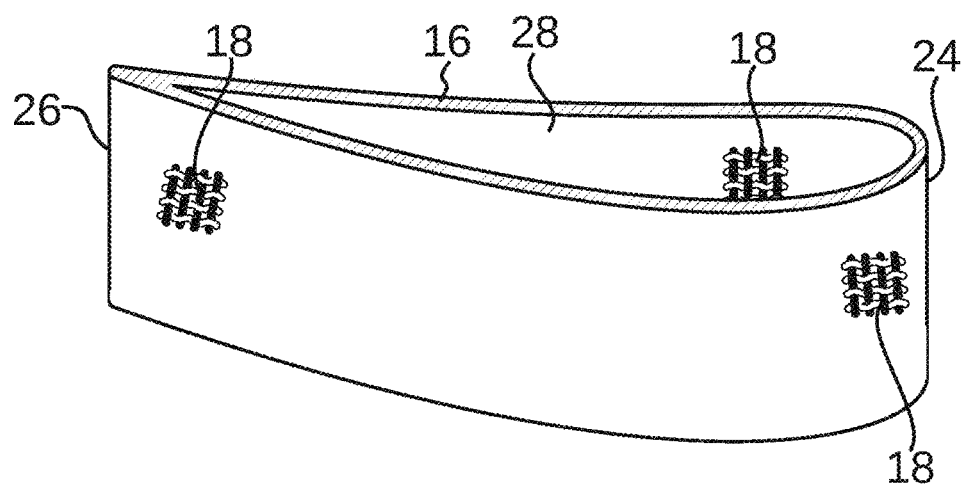
FIG. 2 shows a schematic illustration of a section of a rotor blade having sensor devices according to one embodiment of the present invention.

A plurality of sensor fabrics 18 are arranged on or in a section of the rotor blade 16 shown in FIG. 2. One sensor fabric 18 is arranged in the region of a leading edge 24, one sensor fabric is arranged in the region of a trailing edge 26, and one sensor fabric 18 is arranged on an inner side 28 of the rotor blade 16.

The sensor fabrics 18 which are arranged in the region of the leading edge 24 and in the region of the trailing edge 26 can, for example, be designed to measure expansion, pressure and temperature. The sensor fabric 18 which is arranged on the inner side 28 of the rotor blade 16 can, for example, be designed to measure vibrations.

In some embodiments, at least one of the sensor fabrics 18 is able to be heated. This can be achieved in particular by current being conducted through the heatable sensor fabric 18 and heating up the latter as a result. Such a heatable sensor fabric 18 can, for example, be advantageously arranged in the region of the leading edge 24 because ice can form to a greater extent there.

In some embodiments, the processing device can be set up to determine a need to heat the sensor fabric 18 from sensors, for example of the sensor fabric 18 and/or other connected sensors. In this case, the processing device can prevent or at least hinder icing of the rotor blade 16 largely autonomously. For this purpose, in some embodiments, the processing device can comprise an AI decision-making device.

Figure 3:
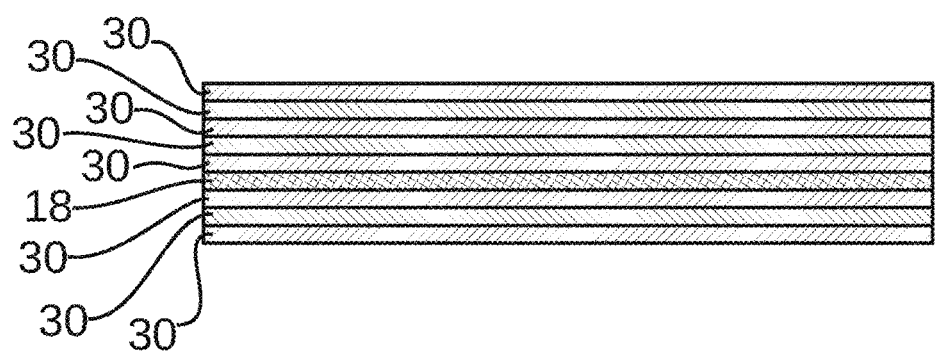
FIG. 3 shows a schematic illustration of a laminated section of a rotor blade having a sensor fabric laminated into it according to one embodiment of the invention and FIG. 4 shows a schematic illustration of a cross section through a rotor blade with possible arrangements of sensor devices according to embodiments of the present invention.

The sensor fabrics 18 can, for example, be arranged on a surface of the rotor blade 16. In further embodiments, the sensor fabrics 18 can, for example, also be arranged within walls of the rotor blade 16. This is in particular advantageously possible when the rotor blade 16 comprises a material which is formed of a plurality of layers connected to one another (composite material). A section made of such a composite material is shown in FIG. 3. The sensor fabric 18 is, for example, arranged between a plurality of material layers 30 as a further layer. By virtue of this arrangement and the direct connection with the layers 30, the sensor fabric 18 can, for example, directly measure the mechanical parameters to which the material layers 30 are also subjected. As a result, for example, individual events, for example being struck by a bird or hail, can be identified and located particularly precisely.

Figure 4:
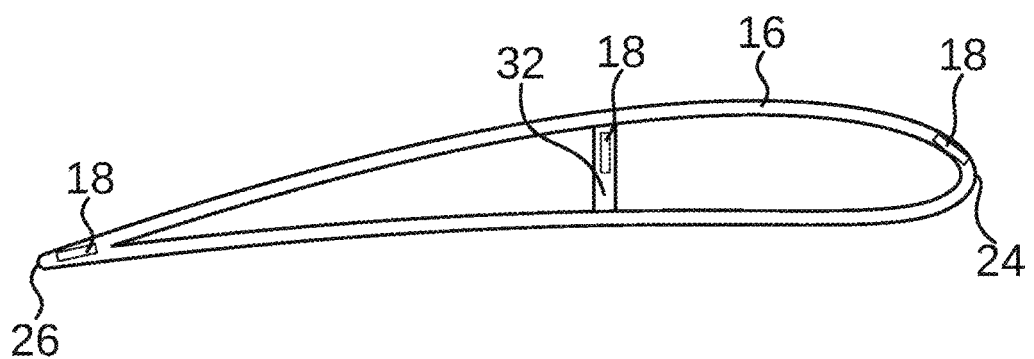

One of many possible arrangements of the sensor fabrics 18 in the rotor blade 16 is, for example, shown in FIG. 4. The sensor fabrics 18 can be arranged not only in outer walls of the rotor blade 16, that is to say, for example, in the region of the leading edge 24 or of the trailing edge 26, but also in internal structures, for example a crosspiece 32.

In some embodiments, the processing device can be embodied separately from the control device 22. In further embodiments, a plurality of processing devices can be provided.

In some embodiments, the sensor fabric 18 can also extend over the entirety of the outer surface of the rotor blade 16 or else inside the entirety of the walls of the rotor blade 16. In further embodiments, sensor fabrics 18 are provided, for example, in at least 10%, at least 50%, at least 80% or at least 95% of the walls of the rotor blade 16.

The sensor fabric 18 can, for example, be a fabric which comprises measuring fibers, for example fibers the resistance of which changes as they expand. In further embodiments, the measuring fibers can have piezoelectric properties. The measuring fibers are, for example, arranged in the fabric such that the processing device can, for example, detect the desired parameter at a multiplicity of measuring sections directly or by combining the measured electrical properties of the measuring fibers. In further embodiments, the sensor fabric 18 can, for example, comprise fibers made of nanotubes. In further embodiments, the fibers can, for example, also provide an energy supply.

In some embodiments, the sensor fabric 18 can comprise an energy generation device, for example piezoelectric and/or piezoresistive fibers. The electrical energy generated by such fibers, for example from vibration, can be used to supply energy to devices, for example the processing device and/or the processing device. In some embodiments, for example, a rechargeable battery for storing electrical energy can be provided.

In some embodiments, the processing device and/or the state monitoring device comprise/comprises a communication device by means of which the detected measured parameters and/or an identified state of the rotor blade 16 are able to be transmitted to a communication partner, for example a server, a router and/or a relay. In particular for monitoring larger wind farms, a combination of the detected measured parameters from different wind turbines 10 can be provided. In some embodiments, the detected measured parameters can be processed by means of a processing device, in particular an AI processing device, in order to identify a possible warning state and/or switch-off state.

The state monitoring apparatus according to the invention is able to be easily integrated in existing designs of rotor blades 16 since, on account of the flexible sensor device, it can be integrated in the existing material structure without adversely affecting the properties or performance of the material of the rotor blades 16. The fact that the sensor device is flexible in particular means that the sensor device can be arranged along a straight or curved surface. Since the inclusion of the state monitoring apparatus according to the invention in the rotor blades 16 does not change the method for producing the rotor blades 16, the state monitoring apparatus can also be easily produced.

The electronics necessary for operation, for example for the processing device and/or the control device 22, can for example, be arranged outside the rotor blades 16 and, if necessary, can be configured so as to be exchangeable.

The apparatuses and methods described here are able to be implemented at least in part on commercial computers by means of software. For example, states can be implemented by contents of a storage location of a working memory of the computer. For example, the state monitoring apparatus and/or the processing apparatus can comprise a computer, for example having connections to sensor devices, wherein the sensor devices can deliver digital and/or analog data, for example measurement data, which are processed by software executed on the computer in order to train the apparatuses. The division of the implementation of apparatuses into hardware and/or software is left to the implementing person skilled in the art as a technical choice.

The described state monitoring apparatus allows, for example, the wind turbine 10 to respond autonomously to unexpected mechanical load conditions, to changes in the environment, for example formation of ice, and, in the case of a warning state, allows a subsequent inspection, for example by means of a drone. The state monitoring apparatus is able to be operated largely autonomously, for example by generating energy from vibration and/or AI-controlled response to environmental influences, for example in order to avoid formation of ice.

LIST OF REFERENCE SIGNS

10 Wind turbine
12 Nacelle
14 Hub
16 Rotor blade
18 Sensor fabric
20 Inspection device
22 Control device
24 Leading edge
26 Trailing edge
28 Inner side
30 Material layer
32 Crosspiece

The invention claimed is:

1. A state monitoring apparatus for at least one rotor blade of a wind turbine, comprising at least one flexible sensor device having a multiplicity of measuring sections, wherein the measuring sections are arranged and set up on a multiplicity of sections of the rotor blade to each measure at least one parameter, and a processing device for detecting and/or processing the measured parameters, wherein the sensor device comprises a sensor fabric, wherein in at least one measuring section the sensor fabric is laminated together with a plurality of material layers of the rotor blade.

2. The state monitoring apparatus as claimed in claim 1, wherein the processing device is configured to identify a state of the rotor blade by comparing the parameters to predetermined values, wherein the state can be at least one of the following states: normal state, warning state and/or switch-off state, wherein the processing device identifies a normal state when the parameters do not exceed predetermined maximum values, do not fall below predetermined minimum values, and do not differ from predetermined normal values by more than a predetermined factor, and wherein the processing device identifies a warning state when the parameters exceed the predetermined maximum values, fall below the predetermined minimum values, or differ from the predetermined normal values by more than the predetermined factor.

3. The state monitoring apparatus as claimed in claim 2, wherein the state monitoring device has an assigned inspection device for inspecting the rotor blade, wherein an inspection is able to be triggered by identification of a predetermined state.

4. The state monitoring apparatus as claimed in claim 3, wherein the inspection device comprises an unmanned aerial vehicle for inspecting the rotor blade.

5. The state monitoring apparatus as claimed in claim 3, wherein the inspection device comprises an unmanned surface drone for inspecting the rotor blade.

6. The state monitoring apparatus as claimed in claim 1, wherein the sensor device is able to be heated at least in sections.

7. The state monitoring apparatus as claimed in claim 1, wherein the sensor device comprises an energy generation device.

8. A rotor blade for a wind turbine, comprising at least one state monitoring apparatus as claimed in claim 1.

9. The rotor blade as claimed in claim 8, wherein at least one section of the sensor device is laminated into the rotor blade.

10. A wind turbine, comprising at least one rotor blade as claimed in claim 8.

11. A wind turbine, comprising at least one state monitoring apparatus as claimed in claim 1.

12. The wind turbine as claimed in claim 11, wherein a control device for controlling the wind turbine, wherein the control device is configured to switch off the wind turbine when a predetermined switch-off state of the rotor blade is identified.

13. The state monitoring apparatus as claimed in claim 1, wherein the sensor fabric is arranged on a surface of the rotor blade.

14. The state monitoring apparatus as claimed in claim 1, wherein the sensor fabric extends over the entirety of an outer surface of the rotor blade to provide the multiplicity of measuring sections.

15. The state monitoring apparatus as claimed in claim 1, wherein the sensor fabric comprises measuring fibers, configured with piezoelectric or piezoresistive properties.

* * * * *